United States Patent
Jain et al.

(10) Patent No.: US 10,491,373 B2
(45) Date of Patent: Nov. 26, 2019

(54) HOMOMORPHIC DATA ANALYSIS

(71) Applicant: Microsoft Technology Licensing, LLC, Redmond, WA (US)

(72) Inventors: Prateek Jain, Bangalore (IN); Ramarathnam Venkatesan, Redmond, WA (US); Jonathan Lee, Berkeley, CA (US); Kartik Gupta, Chennai (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 178 days.

(21) Appl. No.: 15/620,090

(22) Filed: Jun. 12, 2017

(65) Prior Publication Data

US 2018/0359078 A1    Dec. 13, 2018

(51) Int. Cl.
*H04L 9/00* (2006.01)
*H04L 29/06* (2006.01)
*G06N 20/00* (2019.01)
*G06F 21/60* (2013.01)

(52) U.S. Cl.
CPC ............ *H04L 9/008* (2013.01); *G06F 21/602* (2013.01); *G06N 20/00* (2019.01); *H04L 63/0428* (2013.01); *H04L 2209/46* (2013.01)

(58) Field of Classification Search
CPC .............................. H04L 9/008; H04L 2209/46
See application file for complete search history.

(56) References Cited

U.S. PATENT DOCUMENTS

| | | | | |
|---|---|---|---|---|
| 6,118,850 A | * | 9/2000 | Mayo | G01N 23/2076 378/82 |
| 8,862,895 B2 | | 10/2014 | Rieffel et al. | |
| 8,897,449 B1 | * | 11/2014 | Broadbent | H04L 9/0891 380/277 |
| 9,306,738 B2 | * | 4/2016 | Loftus | H04L 9/008 |

(Continued)

FOREIGN PATENT DOCUMENTS

CN     106022360 A     10/2016

OTHER PUBLICATIONS

Zhang et al.; Privacy Preserving Deep Computation Model on Cloud for Big Data Feature Learning; 2016; IEEE; Transactions on computers, vol. 65, No. 5; pp. 1-12, as printed. (Year: 2016).*

(Continued)

*Primary Examiner* — Saleh Najjar
*Assistant Examiner* — Michael W Chao
(74) *Attorney, Agent, or Firm* — Schwegman Lundberg & Woessner, P.A.

(57) ABSTRACT

Systems, methods, and computer-executable instructions for homomorphic data analysis. Encrypted data is received, from a remote system, that has been encrypted with an encryption key. A number of iterations to iterate over the encrypted data is determined. A model is iterated over by the number of iterations to create an intermediate model. Each iteration updates the model, and the model and the intermediate model encrypted with the encryption key. The intermediate model is provided to the remote system. An updated model based upon the intermediate model is received from (Continued)

the remote system. The updated model is iterated over until a predetermined precision is reached to create a final model. The final model is provided to the remote system. The final model is encrypted with the encryption key.

19 Claims, 4 Drawing Sheets

(56) References Cited

U.S. PATENT DOCUMENTS

| | | | | |
|---|---|---|---|---|
| 10,320,752 | B2* | 6/2019 | Hardy | G06F 21/6254 |
| 2016/0004874 | A1* | 1/2016 | Ioannidis | H04L 9/008 |
| | | | | 713/165 |
| 2017/0039487 | A1 | 2/2017 | Naganuma et al. | |
| 2017/0134156 | A1* | 5/2017 | Laine | G06F 7/483 |
| 2017/0310643 | A1* | 10/2017 | Hardy | G06F 21/6254 |
| 2017/0372226 | A1* | 12/2017 | Costa | G06N 20/00 |
| 2018/0276417 | A1* | 9/2018 | Cerezo Sanchez | G06F 8/41 |
| 2019/0182216 | A1* | 6/2019 | Gulak | G06Q 20/3829 |

OTHER PUBLICATIONS

Yu et al.; Toward Secure Multikeyword Top-k Retrieval over Encrypted Cloud Data; 2013; IEEE; Transactions on Dependable and Secure Computing, vol. 10, No. 4; pp. 1-12, as printed. (Year: 2013).*
Smart et al.; Fully Homomorphic Encryption with Relatively Small Key and Ciphertext Sizes; 2010; Springer; PKC 2010, LNCS 6056; pp. 1-24 as printed. (Year: 2010).*
Graepel et al.; ML Condential: Machine Learning on Encrypted Data; 2012; ICISC 2012, LNCS, vol. 7839; pp. 1-15 as printed. (Year: 2012).*
Gentry, Craig; Fully Homomorphic Encryption Using Ideal Lattices; 2009; ACM; STOC '09, May 31-Jun. 2, 2009; pp. 1-10, as printed. (Year: 2009).*
David J. Wu, "Fully Homomorphic Encryption: Cryptography's Holy Grail", In the ACM Magazine for Students—Cryptography, vol. 21, Issue 3, Mar. 2015, 8 pages.
"T5. Big Data Analytics Over Encrypted Data", https://www.acsac.org/2016/program-files/p67.html, Published on: Dec. 6, 2016, 2 pages.
Yasuda, et al., "Secure Data Devolution: Practical Re-encryption with Auxiliary Data in LWE-based Somewhat Homomorphic Encryption", In Proceedings of the 3rd International Workshop on Security in Cloud Computing, Apr. 14, 2015, pp. 53-61.
Bost, et al., "Machine Learning Classification over Encrypted Data", In Proceedings of 22nd Annual Network and Distributed System Security Symposium, Feb. 8, 2015, 14 pages.
Mallaiah, et al., "Applicability of Homomorphic Encryption and CryptDB in Social and Business Applications: Securing Data Stored on the Third Party Servers while Processing through Applications", In International Journal of Computer Applications, vol. 100, Issue 1, Jan. 1, 2014, pp. 6-19.
Pereira, et al., "Principal Component Analysis over encrypted data using homomorphic encryption", http://siaiap34.univali.br/sbseg2015/anais/SBSegResumos/resumoEstendido08.pdf, Published on: 2016, 4 pages.
Ohrimenko, et al., "Oblivious Multi-Party Machine Learning on Trusted Processors", In Proceedings of the 25th USENIX Security Symposium, Aug. 10, 2016, 19 pages.
Chen, et al., "Simple Encrypted Arithmetic Library—SEAL v2.1", In Technical Report of MSR-TR-2016-68, Sep. 30, 2016, 16 pages.
Boyd, et al., "Convex Optimization", In Publication of Cambridge University Press, Mar. 8, 2004, 730 pages.
Gentry, Craig, "Fully homomorphic encryption using ideal lattices", In Proceedings of the forty-first annual ACM symposium on Theory of computing, May 31, 2009, 169-178 pages.
Brakerski, et al., "Fully homomorphic encryption without bootstrapping", In Proceedings of seventh annual East Coast Combinatorics Conference, May 4, 2011, 27 pages.
Brakerski, Zvika, "Fully homomorphic encryption without modulus switching from classical gapSVP", In Proceedings of the 32nd Annual Cryptology Conference on Advances in Cryptology, Aug. 19, 2012, 20 pages.
Lopez-Alt, et al., "On-the-fly multiparty computation on the cloud via multikey fully homomorphic encryption", In Proceedings of the forty-fourth annual Acm symposium on Theory of computing, May 19, 2012, pp. 1219-1234.
Wang, et al., "Healer: homomorphic computation of exact logistic regression for secure rare disease variants analysis in GWAS", In Journal of Bioinformatics, vol. 32, Issue 2, Jan. 15, 2016, 28 pages.
Cheon, et al., "Homomorphic computation of edit distance", In Publication of Financial Cryptography and Data Security, Jan. 2015, pp. 1-16.
Lauter, et al., "Private computation on encrypted genomic data", In Proceedings of International Conference on Cryptology and Information Security in Latin America, Sep. 17, 2014, pp. 1-21.
Bos, et al., "Private predictive analysis on encrypted medical data", In Journal of Biomedical Informatics, vol. 50, Aug. 2014, 19 pages.
Dowlin, et al., "Cryptonets: Applying neural networks to encrypted data with high throughput and accuracy", In Proceedings of the 33nd International Conference on Machine Learning, Jun. 19, 2016, pp. 1-12.
Graepel, et al., "ML confidential: Machine learning on encrypted data", In Proceedings of the 15th international conference on Information Security and Cryptology, Nov. 28, 2012, 15 pages.
Schuster, et al., "Vc3: Trustworthy data analytics in the cloud using SGX", In Proceedings of the IEEE Symposium on Security and Privacy, May 17, 2015, pp. 38-54.
Johnson, et al., "Accelerating stochastic gradient descent using predictive variance reduction", In Proceedings of the 26th International Conference on Neural Information Processing Systems, Dec. 5, 2013, pp. 1-9.
Bach, et al., "Non-strongly-convex smooth stochastic approximation with convergence rate o(1(n))", In Proceedings of the 26th International Conference on Neural Information Processing Systems, Dec. 5, 2013, pp. 1-9.
Duchi, et al., "Adaptive subgradient methods for online learning and stochastic optimization", In Journal of Machine Learning Research, vol. 12, Jul. 2011, 2121-2159 pages.
Tibshirani, Robert, "Regression shrinkage and selection via the lasso", In Journal of the Royal Statistical Society, vol. 58, Issue 1, 1996, 267-288 pages.
Gentry, et al., "Homomorphic evaluation of the AES circuit", In Proceedings of 32nd Annual Cryptology Conference, Aug. 19, 2012, 34 pages.

* cited by examiner

HOMOMORPHIC DATA ANALYSIS

BACKGROUND

Cloud computing has become a preferred computing platform for numerous businesses. Cloud computing alleviates the need for maintaining a business' own data center while still ensuring anytime availability and enough computational power for data analysis. Data analysis has become a key component of most companies' decision making process. Data analysis allows the company to leverage its consumer's data to provide better and cost effective services and gain competitive advantages.

However, a business cannot have security control over cloud computing resources and hence is significantly more vulnerable to attacks on its sensitive data. This might pose disadvantages that nullify the business' competitive advantages of using cloud computing.

DETAILED DESCRIPTION

In accordance with techniques described herein, machining learning algorithms may run on encrypted data. Intermediate results may be passed back to a client system. The client system may process the intermediate results, in either encrypted or decrypted form, and provide a machine learning model back to the server system. The server system may then complete the machine learning task and provide the results to the client system. Importantly, the server system does not decrypt the data. Rather, the machine learning is done over the encrypted data. The client's data, therefore, is never exposed on the server system in an unencrypted form.

In accordance with techniques described herein, a client may control the security of its own data via encryption while allowing a remote system to provide results of data analysis that uses the encrypted data. For example, company A has data from its customers which is critical for the company both from legal point of view as well as competitive advantage point of view. Company A, therefore, wants to protect the data but at the same it wants to do some data analysis on its customers' data. For this task, company A wants to use cloud services of company B, so that it doesn't have to build a large datacenter itself.

Company A, however, might be worried that company B or some malicious third party might access its customers' data, which may create, among other issues, legal problems for company A. To avoid this, company A may want to encrypt its consumer data and upload the encrypted data to the cloud hosted by company B. Using public-private key encryption, however, will not allow company A to control the security of its data since company B would need to decrypt the data to complete the requested data analysis.

Described in detail below is an encryption scheme that can encrypt data using a private key while still allowing basic arithmetic operations to be performed on the data using only the encrypted data and a public computation key. The public computation key, however, cannot decrypt the encrypted data.

In an example, a client which owns the data wants to use a server (which might be compromised) to perform arithmetic operations on the data while keeping the data secure. A server (or a cloud provider) receives encrypted data and performs arithmetic operations on it. The server is assumed to perform the required operations correctly. However, even if server does not perform the required operations correctly, it will not compromise the input data.

The described encryption scheme uses an encryption key, a decryption key and a computation key. These keys are all generated by the client (for example company A in the above scenario). The client keeps the encryption key and the decryption key private and not with available to any third entity. The computation key may be publicly available. For example, the computation key may be sent to the server or cloud service provider, e.g., company B.

As an example, the client (company A) encrypts its data using the encryption key and sends the encrypted data to the server (hosted by company B) while ensuring that the original data is kept secure on its own premises. Company A may decide to destroy the original data. Company A may also send the computation key to company B. Company B may use the computation key to perform addition, multiplication or division operations over the encrypted data and sends the results of these operations back to company A. Company A may then use the decryption key to decrypt the final solution.

In accordance with techniques described herein, a novel encryption scheme is described that allows arithmetic operations to be performed efficiently. The encryption scheme is strictly harder than solving factorization. This implies the safety of the data based on accepted standards of risk. A server-client communication framework is described that is based on the realization that although the data size may be large, e.g., multiple petabytes, the model sizes are usually much smaller, e.g., by an order of magnitude or more compared to the data size. Machine learning algorithms are described that operate on the encrypted data. These machine learning algorithms may solve least squares problems and/or a system of linear equations. Further, many supervised machine learning problems may be solved by solving a series of least squares problems.

Figure 1:
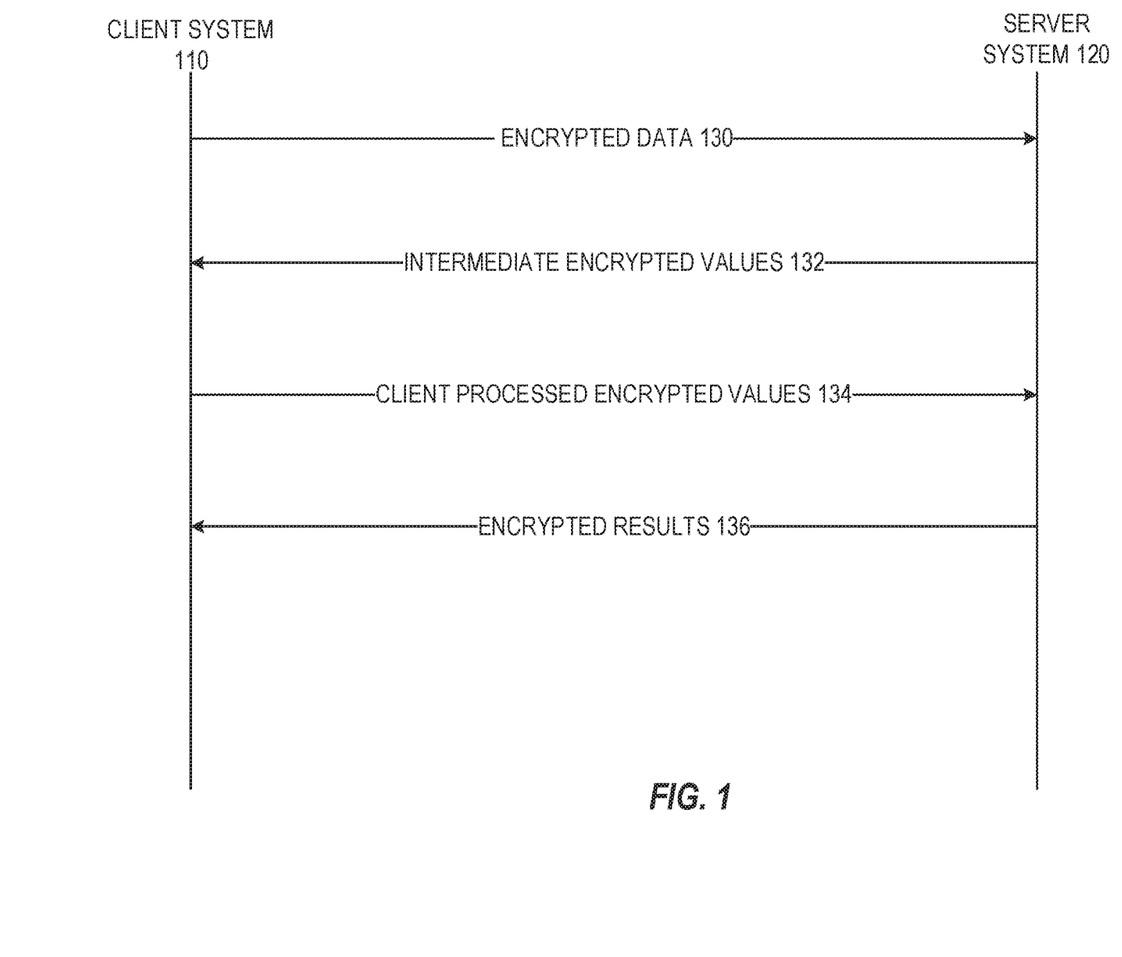
FIG. 1 is a flow diagram of processing encrypted data at a server system in accordance with respective examples.

FIG. 1 is a flow diagram of processing encrypted data at a server system 120 in accordance with respective examples. A client system 110 has various stores of data. The client may want to run machine learning algorithms on this data, and would like to use the server system 120 to run the machine learning algorithms. In an example, the server system 120 is a cloud-based system with a large amount of shared or dedicated computing resources. The client system 110 may encrypt the data. For example, the data may be encrypted using an encryption key. The decrypted data, therefore, would only be available using a decryption key. The client, therefore, may ensure the safety of its own data by limiting access to these keys.

The encrypted data may be sent 130 to the server system 120. The server system 120 may store the data on various storage devices. The server system 120 may perform machine learning on the encrypted data, without decrypting the data. In an example, the server system 120 is unable to decrypt the data as the client system 110 has not and is not required to provide the decryption key needed to decrypt the data. During the training, the server system 120 may transmit intermediate results 132 to the client system 110. For example, intermediate results may be a partially trained model. The client system 110 may run some operations on the encrypted intermediate results or may decrypt the data and run some operations. For example, the intermediate results may include weights of a partially trained model. These weights may be a number with a large numerator and a large denominator. The operations may include rounding the weights to values that can be represented with smaller numerators and denominators. The result of these operations is passed back to the server system 120 in an encrypted form 134. The server system 120 may then complete the modeling 136. In an example, the client system 110 is sent intermediate results multiple times before the modeling is complete. The processing of the intermediate results, however, requires less computing power compared with the modeling that is done on the server system 120.

In an example, the client system 110 may ping the server system 120 to receive a prediction of when new intermediate results, e.g., data points, will be available. In an example, the server system 120 may provide the client system 110 with an indication when new intermediate results will be available without being pinged by the client system 110.

Various parameters such as an amount of communication between client and server, an amount of computation the client should do, security guarantee for the encryption scheme, and accuracy and scalability of machine learning algorithms impact how useful the disclosed system is to clients. Described herein are an encryption scheme and machine learning (ML) training algorithms that consider the above parameters. In an example, the disclosed encryption scheme includes generating three keys: an encryption key, a decryption key, and a computation key. The encryption and decryption key may be private to the client while the computation key is shared with the server system. The computation key, however, is unable to decrypt the encrypted data. In an example, all the keys are random matrices or their inverses. Encryption may be based on multiplying the input with a random matrix over a finite field. Due to the linear structure, performing addition is possible. Multiplication/division of encrypted data may use the computation key.

After the encrypted data is uploaded on the server, the server may try to train various machine learning models. A general class of supervised learning algorithms, which include important problems such as linear regression, logistic regression, sparse regression etc. may be used to train a machine learning model. For a linear regression problem, a standard stochastic gradient descent (SGD) algorithm may be used over the encrypted data using the provided computation key. However, for other problems like logistic regression, standard SGD may require several rounds of communication between client and server. In an example, the problem may be reduced to a series of weighted linear regression which may be solved using the method mentioned above. This scheme reduces the communication between the server system and the client system and leads to a more efficient solution.

As described above, various features described herein use matrices. Matrices may be represented with bold capital alphabets like X and vectors with bold small letters like w. For a matrix X, the ith row of the matrix is referred to as $x_i$. $x_{ij}$ is used to represent the element in the ith row and jth column. For a vector w, $w_i$ to represent the vector's ith element. The symbols • and ○ to represent the dot product and element-wise product of two vectors respectively.

For an entity u, û is used to represent its encrypted version. The notation diag($\alpha$) to represent a diagonal matrix with vector $\alpha$ as its diagonal. In addition, V($\alpha$) to represent a Vandermonde matrix.

Homomorphic encryption schemes allow for evaluation of any circuit e.g., an arithmetic operation, over the underlying plain data while observing only the encrypted version of the data. Some homomorphic encryption schemes rely on security guarantees that require hardness of certain ring-LWE (learning with errors) problems which is a relatively new assumption that is untested in practice. In contrast, the described encryption scheme as well as the majority of the non-homomorphic cryptography systems are based on hardness of factorization.

Another concern with the existing homomorphic schemes is that they need a certain 'bootstrapping' procedure after a certain number of operations. The bootstrapping procedure needs to be applied to the entire dataset rather than the trained model, which may lead to infeasible communication and computation costs in the big-data regime. In contrast, the described encryption scheme allows for an arbitrarily number of additions, multiplications and divisions, as long the numbers being operated upon and the numbers generated in the results fall into a specified range. Moreover, in some examples, the intermediate communication/computation for client operates only on the trained model which is of significantly smaller size than the entire training data. Thus, once a model is trained/learned, the described system may output predictions for infinitely many test points, while the existing homomorphic encryption methods would need to bootstrap after predicting for a fixed number of test points.

In an example, machine learning algorithms are used that are based on iteratively reweighted last squares (IRLS) which reduce the optimization problem to a series of weighted least squares problems. These machine learning algorithms may use the encrypted client data without having to decrypt the data or without requiring bootstrapping.

Suppose the client has a set of points $(x_1, y_1) \ldots (x_n, y_n)$ where $x_i \in R^d$ and the client wants to learn a linear regression function $w \in R^d$ s.t. $x_i \cdot w \sim y_i$. This function may be learned by minimizing the least squares loss function $\Sigma_i(x_i \cdot w - y_i)^2$ which is at least O(nd) computation. Using a cloud-based system, therefore, may be beneficial to more efficiently solve this problem. In an example, the client may send the encrypted data $(\hat{x}_1, \hat{y}_1) \ldots (\hat{x}_n, \hat{y}_n)$ to a remote system, such as a cloud system. The remote system may run machine learning algorithms and return an encrypted model $\hat{w}$ to the client system. In addition, the remote system may provide predictions $\hat{y}'_1, \ldots \hat{y}'_n$ on some new data $\hat{x}'_1, \ldots \hat{x}'_n$. The client system may provide the new encrypted data and the remote system may provide the encrypted predictions back to the client system.

As described above, as part of the machine learning by the remote system, intermediate results may be provided back to the client system. In an example, the intermediate result may be an encrypted approximation $\hat{w}'$ of the model $\hat{w}$. The client system receives $\hat{w}'$ and sends an encrypted transformed value $\hat{w}''$ to the remote system. For moderately sized data sets, a model size is much less than the data used to learn the model. Accordingly, the amount of communication performed in the intermediate steps when compared to the size of the data, on which the complexity of the algorithm depends is relatively small.

In an example, the encryption scheme includes an encryption key, a decryption key and a computation key. All the keys may be generated by the client. The encryption and decryption keys may be private. Thus, a client is able to maintain the security of its own data. The computation key is provided to the server together with the encrypted data.

In an example, the described encryption scheme may work on k instances of an operation at the same time, e.g., for any operation, say addition, it takes in k pairs of numbers and returns the answer to these k additions together. In this example, this means that numbers are always encrypted in k-tuples. Vectors of size k are used to denote this. Note that the k different operations that happen simultaneously do not interact with each other. Hence, k instances of an arithmetic circuit may be evaluated at the same time. These circuits may be referred to as vector circuits. The notation û is used to represent the encryption of a k-dimensional vector u.

The described encryption scheme has various features. The encryption scheme works with rationals, which may be needed by the machine learning algorithms used on the encrypted data. A subset of rationals is encoded to a subset of integers. The integer encodings form the plaintext which gets encrypted. The basic operations of addition, subtraction, multiplication and division of the rationals may be performed directly on the encodings. The division operation is essentially multiplication with the 'inverse'.

The ciphertext produced is a linear transformation of the plaintext. Hence, for a plaintext u, to compute cu or u/c, where c is a constant, then only cu or u/c respectively needs to be computed. To multiply two sets of k numbers, u and v, a matrix transformation of the vector $\hat{u}°\hat{v}$ may be done.

Thus, the following operations: encryption, decryption, addition, subtraction, multiplication and division by a constant, and multiplication, all involve only matrix vector products and may be implemented efficiently in practice. Division involves solving a system of linear equations and may be slow in comparison to multiplication.

The encryption scheme is now presented formally. A first scheme which has an $O(k^2)$ overhead for multiplication of $O(k)$ numbers. The scheme may be extended to work with special classes of keys and reduce the multiplication overhead to $O(k)$ by exploiting algebraic properties of Generalized Reed-Solomon codes. The second scheme may be referred to as the Vandermonde scheme. In both schemes, there is no overhead for addition while for division both the schemes have an overhead of $O(k^3)$.

The First Scheme

Linear codes over a ring $R=Z/N\,Z$ for N a semi-prime are considered. Homomorphic evaluation of arithmetic circuits modulo N are provided. For some k, the homomorphic evaluation of the maps:

$$+,°,/:R^k \times R^k \to R^k$$

such that $(u+v)_i=u_i+v_i$, $(u°v)_i=u_iv_i$ and $(u/v)_i=uv^{-1}$. Abstractly, let A be an automorphism of the module $R^k$. Note that + is a linear map on $(R^k)^2$, and that ° is a bilinear map on $(R^k)^2$. Hence after application of the automorphism A, these maps are sent to maps $+_A$ and $°_A$ which are still linear and bilinear respectively. The described scheme may be viewed to provide these maps.

Concretely, a basis is fixed and so the automorphism A may represented by an invertible k×k matrix ($A_{ij}$). Given vectors u, v the various operations related to the scheme are given by:

$$Enc_A(u)=A^{-1}u$$

$$Dec_A(\hat{u})=Au$$

$$\hat{u}+_A\hat{v}=\hat{u}+\hat{v}$$

$$(\hat{u}°_A\hat{v})_i=\Sigma_{jk}T_{ijk}\hat{u}_j\hat{v}_k, T_{ijk}=\Sigma_l(A^{-1})_{il}A_{lj}A_{lk}$$

$$\hat{u}/_A\hat{v}=M^{-1}\hat{u}, M_{ij}=\Sigma_kT_{ijk}\hat{v}_k$$

The matrix T is essentially a tensor for the bilinear operation in the transformed space A. The encryption key EK may be $(A^{-1}, N, k)$, the decryption key DK is (A, N, k), and the computation key CK is (T, N, k). This encryption scheme is homomorphic with respect to addition, multiplication, and division operations and may be represented as:

$$Dec_A(\hat{u}+_A\hat{v})=u+v$$

$$Dec_A(\hat{u}°_A\hat{v})=u°v$$

$$Dec_A(\hat{u}/_A\hat{v})=u/v$$

The Vandermonde Scheme

As mentioned earlier, the basic scheme described above incurs an $O(k^2)$ overhead for multiplication. A Vandermonde scheme may be used to reduce the overhead to $O(k)$. A plaintext-ciphertext pair may be weighted evaluations of a polynomial $f$ of degree<k. Let $\alpha, \gamma \in Q^k$ and $\beta, \delta \in Q^{2k}$, where Q is an appropriate extension of ring R. Therefore, $f$ may encode the plaintext u if $u_i=\gamma_i^{-1}f(\beta_i)$. The length of a ciphertext is twice that of its plaintext. Given a ciphertext û, the plaintext u may be obtained using the transformation $A=V_1\pi V_2^{-1}$ where $$V_1=diag(\gamma^{-1})V(\alpha)$$

$$V_2=diag(\delta^{-1})V(\beta)$$

$$\pi=[I_k|O_k]$$

The transformation interpolates the function $f$ from the ciphertext, evaluates it on points $\alpha$ and weights these evaluations with weights $\gamma^{-1}$ to compute the plaintext. Note that A is a subjective morphism from $R^{2k}$ to $R^k$. Hence, A is right-invertible. $A^{-1}$ may be considered the right inverse $V_2\pi^TV_1^{-1}$ of A.

Now, for plaintexts u and v encoded by polynomials $f$ and g respectively, the plaintext diag($\gamma$)(u°v) is encoded by the polynomial h=$f$·g. This follows from:

$$h(\alpha_i)=f(\alpha_i)g(\alpha_i)=\gamma_i^2u_iv_i$$

The ciphertext diag($\delta$)($\hat{u}°\hat{v}$) may also be encoded by h. This follows from:

$$h(\beta_i)=f(\beta_i)g(\beta_i)=\delta_i^2\hat{u}_i\hat{v}_i$$

Since h=$f$·g can be of degree≥k. While decrypting the ciphertext that h encodes, a fault plaintext may be retrieved because the decryption map ignores coefficients of powers≥k. The degree of h may be reduced while maintaining its evaluations on $\alpha_i$'s. This can be achieved by reducing h modulo $\Pi_i(X-\alpha_i)$. Further details of this reduction follow. A k×2k reducer Red=$V_2^T\pi RV_2^{-1}$diag($\delta$), where the map R is defined as $$\sum_i R_{ij}X^i = X^jD(X)\text{mod}\prod_i(X-\alpha_i).$$

With $D(\alpha_i)=\gamma^{-1}$. Equivalently:

$$R=V(\alpha)^{-1}diag(\gamma)^{-1}[V(\alpha)|diag(\alpha)^kV(\alpha)].$$

This leads to:

$$\hat{u}°_A\hat{v}=Red(\hat{u}°\hat{v}).$$

The construction of $/_A$ is more complex, as for any fixed v the map w→Red(v°w) is not invertible. Thus, to find $\hat{w}=\hat{u}/_A\hat{v}$, a $\hat{w}$ that is both in the preimage of û under the above map, and in the image of Red is needed. Given Red, a 2k×k matrix B may be found such that im(B)=im(Red), e.g., such that the columns B are a basis for the column space of Red. A k×2k matrix K of rank k may also be found such that ker(K) ∩im(Red)={0}, e.g., such that KB is an invertible k×k matrix, which may be done as the row rank of B is k. This also leads to the following:

$$\hat{u} = \text{Red}(\hat{u}°\hat{v})$$

$$\Leftrightarrow \hat{u} = \text{Red diag}(\hat{v})\hat{w}$$

$$\Leftrightarrow K\hat{u} = K \text{ Red diag}(\hat{v})\hat{w}$$

$$\Leftrightarrow K\hat{u} = K \text{ Red diag}(\hat{v})Bw', \hat{w} = Bw'$$

Then $M=K$ Red diag$(\hat{v})B$ is an invertible k×k matrix, and $\hat{w} = BM^{-1}K\hat{u}$. Thus, the operations of this scheme may be listed as follows:

$$\text{Enc}_A(u) = A^{-1}u$$

$$\text{Dec}_A(\bar{u}) = A\hat{u}$$

$$\hat{u} +_A \hat{v} = \bar{u} + \hat{v}$$

$$(\hat{u}°_A\hat{v})_i = \text{Red}(\hat{u}°\hat{v}), \text{Red} = V_2^T \pi R V_2^{-1} \text{diag}(\delta)$$

$$\hat{u}/_A\hat{v} = \hat{w}, \hat{w} = BM^{-1}K\hat{u}, M = K \text{ Red diag}(\hat{v})B$$

Thus, given two k-dimensional vectors u, v for the described Vandermonde encryption scheme with decryption key A, the following may be determined:

$$\text{Dec}_A(\hat{u} +_A \hat{v}) = u + v$$

$$\text{Dec}_A(\hat{u}°_A\hat{v}) = u°v$$

$$\text{Dec}_A(\hat{u}/_A\hat{v}) = u/v$$

Figure 2:
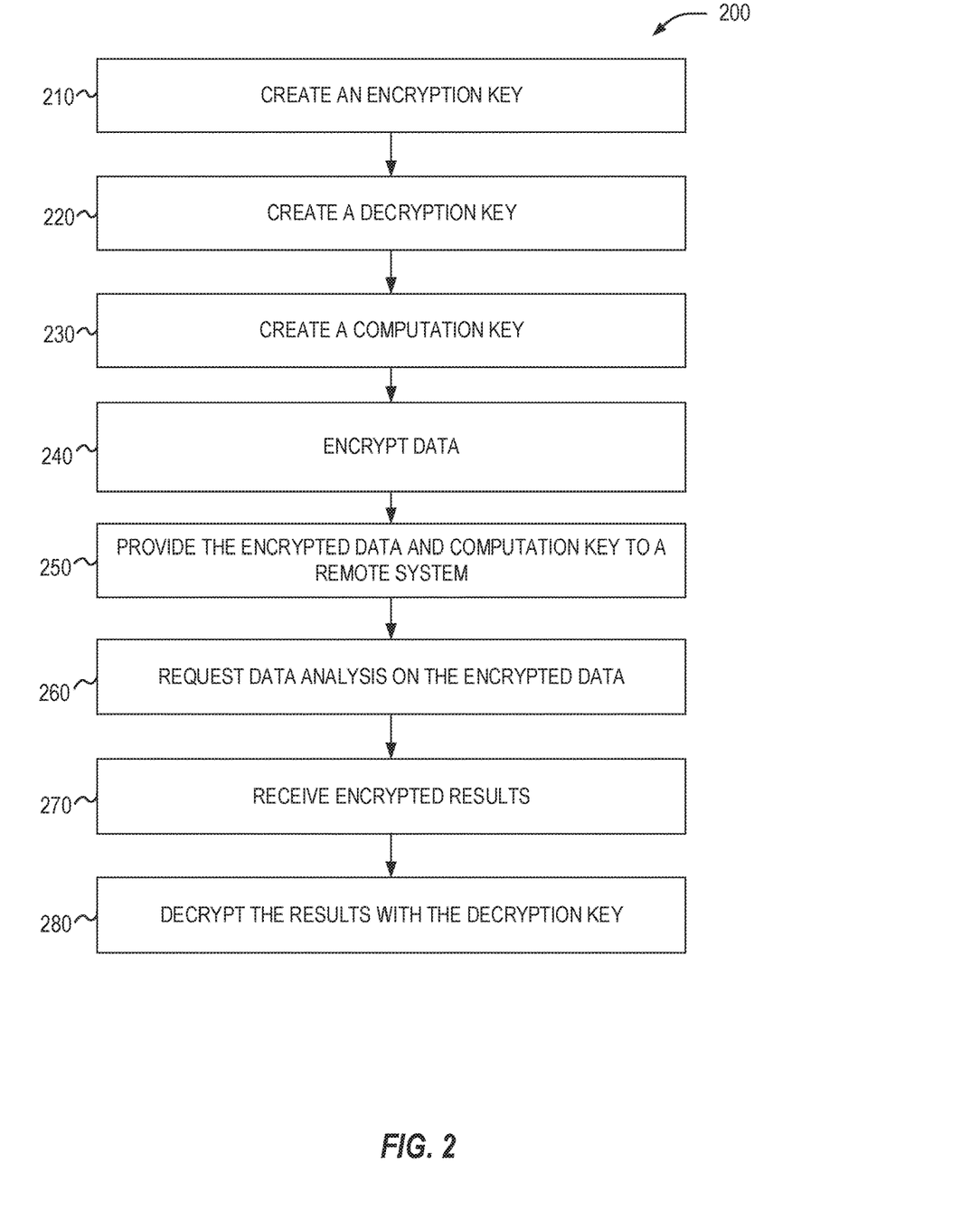
FIG. 2 is a flow diagram of a process flow of homomorphic encryption in accordance with respective examples.

FIG. 2 is a flow diagram of a process flow 200 of homomorphic encryption in accordance with respective examples. The process flow 200 may be executed on a computing device. The process flow 200 may start at 210 by creating an encryption key. For example, a client system may create the encryption key. At 220, a corresponding decryption key is created. In an example, the decryption key is a matrix. The encryption key may be a right inversion of the decryption key. The security of the encryption scheme that uses the encryption key and the decryption key is based upon factorization. The encryption key and the decryption key may be kept private on the client system. Accordingly, remote systems will not have the key needed to encrypt data or decrypt data using the encryption and decryption keys.

At 230, a computation key is created that is based upon the encryption key. In an example, the computation key is based upon the matrix of the decryption key. At 240, data, such as a vector of numbers, is encrypted using the encryption key to create encrypted data. At 250, the encrypted data and the computation key are provided to a remote system. At 260, the client system requests data analysis be done on the encrypted data. For example, the client system may request that a machine learning algorithm be ran on the encrypted data.

In another example, the client system may want to determine an average value and a variance of values. For example, the values may be salary information. The client may have M employees and i-th employee's salary is given by $S_i$. Then, the client forms a vector $x_i$ for i-th employee where first coordinate of $x_i$ is $S_i$ and the remaining k−1 coordinates can be random numbers. Now, client encrypts each $x_i$ using the above encryption operation described above which results in a 2k dimensional vector $\hat{x}_i$. The client then sends all the M vectors $\hat{x}_i$, 1≤i≤M to the server along with the computation key B.

The server then computes the average salary as:

$$\hat{x} = \frac{\sum_i \hat{x}_i}{M}$$

and the variance as $$\hat{V} = \frac{\sum_i (\hat{x}_i - \hat{x})°A(\hat{x}_i - \hat{x})}{M}.$$

The server sends back $\hat{x}$ and $\hat{V}$ to the client. The client may then use the decryption operation to obtain the average salary and variance in the salaries. That is, $x = \text{Dec}_A(\hat{x})$ and $V = \text{Dec}_A(\hat{V})$.

At 270, the encrypted results of the data analysis that was done on the encrypted data is received from the remote system. In an example, the results are a model created by a machine learning algorithm that the remote system creates. In various examples, to create the model, the remote system may provide the client system with an intermediate model. The client system may decrypt the intermediate model using the decryption key and perform rounding on various weights of the model. Once the weights have been rounded, the updated model may be encrypted with the encryption key and sent back to the remote system for further machine learning. In an example, the encrypted result is the final model that has reached a particular level of precision. At 280, the client system decrypts the encrypted result using the decryption key.

In an example, the encryption scheme may be implemented in software written in any standard programming language like C, C++, Java, etc. using standard big-integer libraries. Another implementation may include building specialized hardware to speed up the most common operations used in the scheme. The encryption/decryption operator may be deployed on the client side, that would first generate the encryption, decryption, computation key and then use big-integer libraries to compute the encryption of the given data. The arithmetic operators may be executed on a remote system. The big-integer libraries may be used to perform various operations needed for computing the computation result on the remote system.

To handle rational numbers, rational numbers may be mapped. For example, let N=pq where p, q are primes and Q is the set of all rationals. Let $$Q_n = \left\{ \frac{a}{b} \in Q : GCD(b, N) = 1 \right\},$$

and define $\varphi: Q_n \rightarrow Z/NZ$ by:

$$\frac{a}{b} \rightarrow ab^{-1} \mod N,$$

where $b^{-1}b=1 \mod N$. Then $\varphi$ is injective on $$\left\{\frac{a}{b} \in Q: |a|, b < \sqrt{\frac{N}{2}}\right\}, \text{ as } \varphi\left(\frac{a_1}{b_1}\right) = \varphi\left(\frac{a_2}{b_2}\right)$$

implies that:

$$a_1 b_1^{-1} = a_2 b_2^{-1} \mod N$$
$$a_1 b_2 = a_2 b_1 \mod N$$

And since $$|a_i|, b_i < \sqrt{\frac{N}{2}}$$

both sides are bounded in modules by $$\frac{N}{2},$$

and hence $a_1 b_2 = a_2 b_1$. The map $\varphi$ may be used as the rational encoding.

The map may be use to retrieve a rational number from its encoding. Given some $x \in \mathbb{Z}/N\mathbb{Z}$, $|a|$, $$b < \sqrt{\frac{N}{2}} \text{ such that } x = ab^{-1} \mod N$$

may be found. First, for some integer $$c < \sqrt{\frac{N}{2}},$$

the following holds:

$$bx = a + cN \Rightarrow \frac{x}{N} = \frac{c}{b} + \frac{a}{bN},$$

and note that $$\frac{|a|}{bN} < \left(b\sqrt{2N}\right)^{-1}.$$

So, for there to be two such approximations $$\frac{c_i}{b_i} \text{ to } \frac{x}{N},$$

one has $$\frac{1}{b_1 b_2} \le \left|\frac{c_1}{b_1} - \frac{c_2}{b_2}\right| < \left(\frac{1}{b_1} + \frac{1}{b_2}\right)\frac{1}{\sqrt{2N}}$$

which implies $b_1 + b_2 > \sqrt{2N}$, a contradiction. Hence, the approximation $$\frac{c}{b} \text{ for } \frac{x}{N}$$

is unique for $$b < \sqrt{\frac{N}{2}}.$$

Accordingly, for any real z, the error of an approximation $$\frac{c}{b}$$

for z may be measured by $|bz-c|$. In this case, $$z = \frac{x}{N}$$

is a rational of denominator N, while $$\frac{c}{b}$$

is a rational with denominator $$< \sqrt{\frac{N}{2}}.$$

As the upper bound for b grows, the least possible error decreases. Then, since $$b\frac{x}{N} - c = \frac{a}{N},$$

If $$\frac{c}{b}$$

is the best rational approximation to $$\frac{x}{N} \text{ with } b < \sqrt{\frac{N}{2}},$$

then the derived |a| is minimal, and so if the derived a is bounded in modulus by $$\sqrt{\frac{N}{2}}$$

then $$\frac{a}{b}$$

is the desired rational. To recover a, b from x it suffices to find the rational approximation to $$\frac{x}{N}$$

with the denominator bounded by $$\sqrt{\frac{N}{2}}$$

and least error, a so called "best approximation of the second kind."

For any real $z \in [0,1)$, a continued fraction for z may be defined as:

$cf(0)=[0]$, $cf(z)=[\lfloor z^{-1} \rfloor] \| cf(z^{-1}-\lfloor z^{-1} \rfloor))$ otherwise.

For rationals, the continued fraction is finite, and may be computed in poly-log time. Any rational whose continued fraction is a prefix of cf(z) is a convergent of z. The set of best approximations of the second kind to z are the convergents of z based on a classical theorem.

Therefore, $$\frac{c}{b}$$

must be convergent of the continued fraction expansion of $$\frac{x}{N}.$$

Hence, to recover a, b from x, N the convergent of the continued fraction expansion of $$\frac{x}{N}$$

are computed to find the convergent $$\frac{c}{b}$$

with b greatest such that $$b < \sqrt{\frac{N}{2}},$$

and set a=bx−cN.

In an example, learning algorithms may be used to solve a variety of supervised learning tasks over encrypted data. For example, the data may be encrypted as described above. In an example, the goal of a supervised learning algorithm is to minimize expected risk, e.g., to minimize probability of an incorrect prediction for a random test point $x \in R^d$ sampled from a fixed distribution D. That is, $$\min_w E_{(x,y) \sim D}[l(f(x; w), y)]$$

where x is a randomly sampled input data point, y is the expected output for x, and $(x, y) \sim D$. $f(x; w)$ is the learning algorithm's predicted output for x, and $f$ is a parametric function with w being the parameter that is typically learned. $l: R \to R$ measures loss/risk for predicting $f(x;w)$ instead of y. The loss function typically decreases as $f(x;w)$ gets closer to y.

Unfortunately, in practice, direct access to D is not available. Instead, access to n training points$(x_i,y_i)$, $1 \le i \le n$ which are assumed to be sampled i.i.d. from D are available. So, instead of minimizing the above given true risk, the empirical risk on training data is minimized. That is, the supervised learning problem can be re-cast into the following optimization problem:

$$\min_w \sum_i l(f(x_i; w), y).$$

Often, an L2 regularization term ($\|w\|^2$) is also added to avoid overfitting of w to the training data. However, for ease of exposition, the unregularized objective function given above is considered and the disclosed algorithms may be extended to handle the L2 regularization as well.

A further restriction of the above problem may be considered where $f(x_i;w)$ is a linear function e.g., $f(x_i;w)=x_i \cdot w$ and l is a smooth convex loss function. Then the loss function can be rewritten as, $$\min_w \sum_i l(x_i \cdot w, y_i).$$

Even with these restrictions, this class of problems is still rich and covers a large fraction of important machine learning problems like least squares, logistic regression, etc. As mentioned above, the disclosed algorithms may be extended to handle L2-regularized problems as well. Algorithms for the high dimensional learning problems where L2 regularization is replaced by L1 regularization to promote sparsity in w are also described.

Using only the encrypted version of data $(x_i, y_i)$, $1 \le i \le n$ the above problems may be solved as part of a machine learning process. The disclosed algorithms are designed to address the following two encryption related challenges: 1) ensuring that the amount of data processed on the client side is small, and 2) ensuring that the intermittent rounding-off of various model parameters, necessitated because of the multiple precision nature of the encryption scheme, does not affect the efficacy of the algorithm significantly.

As noted before, the encryption scheme evaluates k instances of an arithmetic circuit simultaneously. This fact is not shown in the notation while presenting the algorithms. A scalar u in the following algorithms is a vector of size k formed by k different numbers, one for each circuit. Similarly, a d dimensional vector w would be a k×d dimensional vector in various implementations. Also, as mentioned before, û is used to represent $Enc_A(u)$ where A is the decryption key. These notations extend to all matrices as well.

The symbols $+_A, \circ_A$ used for denoting addition or product of encrypted numbers are dropped and instead overload the +,° symbols if the operators are clear from the context.

In an actual deployment scenario, the algorithms may consist of two sets of operations: those performed on the client side and those on the server side. Here, the operations are presented in the form of server routines with intermediate steps being carried out on the client. These intermediate steps are highlighted using a * instead of a line number in the algorithms.

The data $(X, y)=([x_1, \ldots, x_n]^T, [y_1 \ldots, y_n])$ in all the algorithms is d dimensional with n points, i.e., $X=[x_1, \ldots, x_n]^T \in R^{n \times d}$ and $y \in R^d$. The learned linear model parameter is represented by $w \in R^d$.

Linear Regression

The goal in a standard linear regression problem is to find a linear hyperplane w that best fits the given data points, e.g., the goal is to find $y_i \approx x_i \cdot w$. Typically, such a w is obtained by minimizing the squared error, e.g., $$\min_w l(w) = \sum_{i=1}^n (y_i - x_i \cdot w)^2.$$

An optimal solution to the above problem is given by: $w^* = (X^T X)^{-1}(X^T y)$. However, computing the inverse of $X^T X$ may be very expensive and unstable; the time complexity of this method is $O(d^2 n + d^3)$. In an example, large datasets may be efficiently processed when the algorithm is linear in d and even sublinear in n. As described below, gradient descent (GD) and stochastic gradient descent (SGD) may be used over the encrypted data to achieve these results.

Gradient Descent.

The standard gradient descent method is an iterative method which moves the current iterate in the negative direction of a gradient to obtain the next iterate. The amount of movement of the current iterate is decided by a step-size or learn rate $\gamma$. That is, to optimize $L(w): R^d \to R$, the following gradient descent update may be used:

$$w^{(t+1)} = w^{(t)} - \gamma \nabla L(w^{(t)})$$

where $\nabla L(w)$ is the gradient of $L(w)$ and $\gamma$ is the step size which can be kept to be a constant or decreased adaptively. Intuitively, such an update moves towards iterates with a smaller gradient, e.g., $\|\nabla L(w)\|$ which implies that the gradient descent update moves towards a local minima or a saddle point. In the case of least squares problem, the objective function is convex and hence saddle points do not exist and all local minima are global minima. The update in this case is given by:

$$\hat{w}^{(t+1)} = \hat{w}^{(t)} - \gamma \hat{X}^T(\hat{X}\hat{w}^{(t)} - \hat{y}),$$

where $\gamma$ is selected appropriately; typically, $$\gamma < \frac{1}{4L}$$

where L is the largest eigenvalue of $X^T X$ matrix. The multiplication and addition operators are the $\circ_A$ and $+_A$ operators described above that work over encrypted data.

The above formulate may be expanded to the following:

$$Enc_A(w^{(t+1)}) = Enc_A(w^{(t)} - \gamma X^T(Xw^{(t)} - y)).$$

Each update, therefore, is multiplied by $\gamma$ which is a number much smaller than 1 based upon that each entry in data matrix X is an integer. Hence, $w_j^{(t+1)}, \forall 1 \le j \le d$ will be given by a rational number whose numerator and denominator is increasing with t. After a small number of iterations, the numerator or denominator of $w_j^{(t+1)}$ may be outside the allowed range of $\sqrt{N/2}$.

If the numerator or denominator falls outside of the range, communication with the client may be used to round off $w_j^{(t+1)}$ so that the value may be represented as a rational number with a numerator and denominator being small. In example, the server system may send the client system some or all of $\hat{w}^{(t+1)}$. The client system may then decrypt the data, rounds the data to include rational numbers with small numerators and denominators, encrypts the rounded data, and sends the encrypted data to the server system. The entire process may be completed via the following pseudocode, which the client system able to complete the steps indicated with a *:

---

1: Input: Initial point
$\hat{w}^{(0)}$, $\hat{X}$, $\hat{y}$, step size $\gamma$, number of iterations per cycle l, convergence tolerance $\epsilon$, precision p.
2: $\rho \leftarrow$ true; $t \leftarrow 1$
3: while $\rho$ do
4: $\hat{w}^{(t)} \leftarrow \hat{w}^{(t-1)} - \gamma \hat{X}^T(\hat{X}\hat{w}^{(t-1)} - \hat{y})$ // GD Update
5: if (i%l =) then
*: $w^{(t)} \leftarrow Decrypt(\hat{w}^{(t)})$

*: $\dfrac{w^{(t)} \leftarrow \lfloor w^{(t)} * 2^P \rfloor}{2^P}$ // precision reduction step

*: $\hat{w}^{(t)} \leftarrow Encrypt(w^{(t)})$
6: end if
7: $\hat{\rho} \leftarrow \|\hat{w}^{(t)} - \hat{w}^{(t-1)}\|$
8: $t \leftarrow t + 1$
9: end while
10: Return: $\hat{w}^{(t-1)}$

---

Given X, y, $\gamma$, and N, l may be precomputed, which is the number of iterations before any rounding-off operation may need to be completed. Using l, the amount of communication between the client system and the server system may also be estimated. In an example, l may be computed as:

$$l \le \frac{p}{2b + \log(4nd)}$$

where p is the size of primes used in the encryption scheme and numbers are represented as integers using b bits. Thus, communication with the client system as well as the computational cost for the client system scales linearly with d and does not depend on the number of points n. This ensures the rounding operations and communication with the client system does not overwhelm the client system.

Stochastic Gradient Descent.

While working with big datasets, using standard gradient descent might be prohibitive as it works with the whole dataset at the same time. Instead of using all the points at the same time to make an update, the update may be made with one point at a time. This reduces the amount of computation required per update drastically. Also, empirically it has been observed that this approach, known as stochastic gradient descent, converges much faster than standard gradient descent.

For a stochastic gradient descent, the loss function may be $l(w^{(t)}) = \Sigma_j l_j(w^{(t)})$ where $l_j$ is the loss function at a single point $(x_j, y_j)$. Then, for a uniformly random j picked from $\{1, \ldots, n\}$ the update for stochastic gradient descent is given as:

$$w^{(t+1)} = w^{(t)} - \gamma l_j(w^{(t)})$$

In an example using least squares, $l_j(w) = (w \cdot x_j - y_j)^2$ and the form of the update for encrypted data is:

$$\hat{w}^{(t+1)} = \hat{w}^{(t)} - \gamma \hat{x}_j (\hat{x}_j \cdot \hat{w}^{(t)} - \hat{y}_j)$$

where step size $\gamma$ is set appropriately; this value may be set to $$< \frac{1}{4 \max_j \|x_{j_2}^2\|}.$$

This step size may be used in gradient descent, which is a factor n smaller than the step size used in stochastic gradient descent. Thus, the rational representation of the step size in stochastic gradient descent is $\log_2 n$ bits smaller.

As noted above, the numerator and denominator of the rational representing $w_j^{(t)}$ $\forall 1 \leq j \leq d$ increases with every update. Noting that X and y may be made of integers then the increase in the denominator depends upon the size of the denominator of the step size only. A larger step size will have a smaller denominator and hence the denominator of $w_j^{(t)}$ will grow comparatively slowly. Thus, more update steps may be performed on the server system before requesting rounding from the client system.

The value l may be precomputed to estimate the client-side communication and computation complexity. In an example, the parameter l may be calculated as $$l \leq \frac{p}{2b + \log(4d)},$$

where l is the maximum number of iterations performed on the server before requesting rounding by the client system. The communication and client-side computation complexity is given by $$O\left(\frac{\kappa \cdot d}{l \cdot \epsilon}\right),$$

where $\kappa$ is the condition number of $X^T X$. Comparing this to the complexity of gradient descent, a factor of $\log_2 n$ is saved in client-side communication and computation complexity while using stochastic gradient descent.

In an example, the algorithm for stochastic gradient descent is given by:

---

1: Input: Initial point $\hat{w}^{(0)}$, $\hat{X}$, $\hat{y}$, step size $\gamma$, number of iterations per cycle l, convergence tolerance $\epsilon$, precision p.
2: $\rho \leftarrow$ true; $t \leftarrow 1$
3: while $\rho$ do
4: $i \leftarrow R[1, \ldots, n]$ // pick a random index
4: $\hat{w}^{(t)} \leftarrow = \hat{w}^{(t-1)} - \gamma \hat{x}_i (\hat{x}_i \hat{w}^{(t-1)} - \hat{y}_i)$ // SGD Update
5: if (i%l = 0) then
*: $w^{(t)} \leftarrow$ Decrypt($\hat{w}^{(t)}$)

*: $\dfrac{w^{(t)} \leftarrow \lfloor w^{(t)} * 2^p \rfloor}{2^p}$ // precision reduction step

*: $\hat{w}^{(t)} \leftarrow$ Encrypt($w^{(t)}$)
6: end if
7: $\hat{\rho} \leftarrow \|\hat{w}^{(t)} - \hat{w}^{(t-1)}\|$
8: $t \leftarrow t + 1$
9: end while
10: Return: $\hat{w}^{(t-1)}$

---

In an example, a gradient descent update may be applied to a general loss function l. For a typical loss function, such as logistic regression, the gradient function may need to handle more arithmetic operations than additions/multiplications. For example, in the case of logistic regression, the gradient function contains terms of the type:

$$\frac{1}{1 + \exp(yx \cdot w)}$$

which cannot be computed with just additions and multiplication operations.

The above gradient function may be approximated using a Taylor series expansion. However, even a quadratic approximation increases the communication significantly due to the numerators and denominators of $w_j^{(t+1)}$ will increase exponentially which increases the amount of communication with the client system. In an example, a series of weighted least squares optimization problems may be used. Each of these problems may be solved using the stochastic gradient descent method described above. The reduction is based on using a Newton update leads to a significant decrease in the number of iterations as the number of iterations reduce to $$O\left(\log \log \frac{1}{\epsilon}\right),$$

where $\epsilon$ is the desired accuracy and the Newton update may be recast as a weighted least squares problem. These observations lead to an iteratively reweighted least squares (IRLS) algorithm where each "outer" step of the algorithm computes the Newton update using the weighted least squares formulation: $w^{(t+1)} = \arg\min \Sigma_{i=1}^n \alpha_i (x_i \cdot w - z_i)^2$, where $\alpha_i = l''(x_i \cdot w^{(t)}; y_i)$ and $$z_i = x_i \cdot w^{(t)} - \frac{l'(x_i \cdot w^{(t)}; y_i)}{l''(x_i \cdot w^{(t)}; y_i)}.$$

Note the number of outer steps may be small. Using this weighted least squares formulation, the server system may communicate $x_i \cdot w^{(t)}, \forall i$ with the client system. The weights and other parameters may then be evaluated by the client side. Each round of client communication, therefore, may cost O(n). The update for the outer step, e.g., the weighted least squares problem may be solved on the server side by using a series of stochastic gradient descent in the "inner" steps. The stochastic gradient descent steps work directly with the encrypted data and the number of iterations before the client system may do rounding is given by l as described above. Below is an example IRLS gradient descent algorithm.

---

1: Input: Initial point
$\hat{w}^{(0)}$, $\hat{X}$, $\hat{y}$, step size $\gamma$, number of iterations per cycle l, number of points n, convergence tolerance $\epsilon$, precision p.
2: $\rho \leftarrow$ true; t $\leftarrow$ 1
3: while $\rho$ do
4: // outer loop
5: Sample b tuples $\{\hat{x}_i, \hat{y}_i\}_{i=1}^b$ from the set of all tuples and stack them to form the matrix $\hat{X}^{(t)}$ and vector $\hat{y}^t$
\*: Compute $\hat{n} = \hat{X}^{(t)}\hat{w}^{(t)}$
\*: Computer n = Decrypt($\hat{n}$),
\*: Compute weights $\beta_i = \sqrt{\alpha_i} = \sqrt{l''(x_i \cdot w^t; y_1)}$, $v_i = \beta_i z_i =$ $$\beta_i \left( x_i \cdot w^{(t)} - \frac{l'(x_i \cdot w^t; y_i)}{l''(x_i \cdot w^t; y_i)} \right) \text{ for all } (x_i, y_i) \in (X^{(t)}, y^{(t)})$$

\*: $\hat{\beta}$ Encrypt ($\beta_i$), $\hat{v}_i \leftarrow$ Encrypt ($v_i$) $\forall 1 \le i \le b$
7: $\hat{w}^{(t)} \leftarrow$ SGD-LS ($\hat{w}^{(t-1)}$, diag($\beta$)$\hat{X}^{(t)}$, $\hat{v}$, $\gamma$, l, n, $\in$, p)
8: $\hat{\rho} \leftarrow \|\hat{w}^{(t)} - \hat{w}^{(t-1)}\|_2$
\*: $\rho \leftarrow$ Decrypt($\hat{\rho}$)
\*: $\rho \leftarrow \rho > \epsilon$
9: t $\leftarrow$ t + 1
10: end while
11: Return: $\hat{w}^{(t-1)}$

---

In an example, the general technique described above may be applied to a logistic regression problem. Logistic regression is a popular method for classification problems and is a special case of $l(x_i \cdot w, y_i)$ given by:

$$l(x_i \cdot w, y_i) = -y_i \log(a_i) - (1-y_i)\log(1-a_i),$$

where $$a_i = \frac{1}{1 + \exp(-x_i \cdot w)}.$$

The gradient descent or the stochastic gradient descent may be applied directly to the above loss function. The algorithm for this application is provided below. As the Hessian of the objective function changes with w, the step size also needs to be selected in each iteration. In an example, the standard Armijo rule for step-size determination may be used. In an example, to reduce the amount of communication between the client and server systems, a second order Taylor series approximation of the loss function may be used. The notation $l_t$ is used to represent the degree-2 Taylor series approximation of the log-loss function l for logistic regression. The second order Taylor series approximation may be given by:

$$l_t(w) = \sum_{j=1}^{n} \left( \log 2 - \frac{\theta_j}{2} + \frac{\theta_j^2}{4} \right)$$

where $\theta_j = y_i(x_j \cdot w)$. Armijo rule starts with a large enough step size and checks if the gradient descent step leads to a decrease in the loss function that may be approximated by its $2^{nd}$ order Taylor series. If there is a decrease, that step size is selected otherwise, the step size is decreased and the loss function is checked again.

---

1: Input: Initial point $\hat{w}^{(0)}$, $\hat{X}$, $\hat{y}$, step size $\gamma$, precision p.
2: $\gamma \leftarrow 1$, K $\leftarrow 10^{-4}$, $\delta \leftarrow 0.5$
3: $\rho \leftarrow$ true; t $\leftarrow 1$
4: while $\rho$ do
5: $\hat{\theta} \leftarrow \hat{y} \circ (\hat{X}\hat{w}^{(t-1)})$ \*: $\theta \leftarrow$ Decrypt($\hat{\theta}$), $\vartheta_i \leftarrow \frac{\lfloor \frac{2^p}{1+e^{\theta_i}} \rfloor}{2^p}$, $1 \le i \le n$ \*: $\hat{\vartheta} \leftarrow$ Encrypt($\vartheta$) //Compute derivate of the log-loss at each point
6: $\hat{\nabla} \leftarrow \Sigma_{i=1}^n \hat{y}_i \hat{\vartheta}_i \hat{x}_i$
7: // step-size computation using Armijo rule
8: while true do
9: $\hat{w}^{(t)} \leftarrow \hat{w}^{(t-1)} - \gamma \hat{\nabla}$
10: $\hat{r} \leftarrow l_t(\hat{w}^{(t)}) - l_t(\hat{w}^{(t-1)}) + k\gamma\|\hat{\nabla}\|_2^2$
\*: r $\leftarrow$ Decrypt($\hat{r}$)
11: if r < 0 then
12: break // the objective function value decreases
13: end if
14: $\gamma \leftarrow \delta\gamma$
15: end while
16: $\hat{\rho} \leftarrow \|\hat{w}^{(t)} - \hat{w}^{(t-1)}\|_2$
\*: $\rho \leftarrow$ Decrypt($\hat{\rho}$), $\rho \leftarrow \rho > \epsilon$
17: t $\leftarrow$ t + 1
18: end while
19: Return: $\hat{w}^{(t-1)}$

---

In an example, some applications may need to learn from high-dimensional data points where the dimensionality of a feature vector d may far exceed the number of available data points n. Text processing and bio-informatics are two example domains where this may be the case. Finding a sparse w which implies the prediction function that would depend on only a small number of features is one way to approach these domains.

For example, two approaches to a sparse domain include using L1 regularization to promote sparsity in w or using an explicit constraint on the number of non-zeros in w. Both approaches may be implemented using the encrypted data as described above.

The L1 regularization approach may optimize the following problem:

$$J(w) = \|Xw-y\|_2^2 + \lambda\|w\|_1$$

where $\lambda > 0$ is the regularization parameter and $\|w\|_1 = \Sigma_j |w_j|$. As L1 norm is not a differentiable function, gradient descent and stochastic gradient descent may not be used directly. Rather, an iteratively reweighted scheme may be used to minimize the above loss function.

Like the IRLS algorithm from above, the L1 regularized problem may be reduced to a series of weighted L2 regularized least squares problem. That is, in the "outer" loop the following optimization problem may be solved:

$$J^{(t)}(w) = \Sigma_i (x_i \cdot w - y)^2 + \lambda \Sigma_j \alpha_j^{(t)} w_j^2,$$

where $\alpha_j^{(t)}$ is the weight corresponding to the jth feature. In the t-the iteration, $$\alpha_j^{(t)} = \frac{1}{|w_j^{(t-1)}|}.$$

Each "outer" iteration solves for the above weighted least squares problem over encrypted data for which a variant of the gradient descent method may be used. The pseudo code for such an algorithm is:

```
1: Input: Initial point
ŵ⁽⁰⁾, X̂, ŷ, step size γ, regularization parameter λ, number of iterations per
cycle l, convergence tolerance ε, precision p.
2: ρ ← true; t ← 1
3: while ρ do
*: α̂_j ← Encrypt( 1/|w_{(t)}^j| ) // computing the weights
4: û⁽¹⁾ ← ŵ⁽ᵗ⁻¹⁾, ρ' ← true, τ ← 1
5: while ρ' do
6: û⁽ᵗ⁺¹⁾ ← û⁽ᵗ⁾ − γX̂ᵀ(X̂ᵀ(X̂û⁽ᵗ⁾ − ŷ) + λ(diag(α)û⁽ᵗ⁾)) // GD Update
7: if τ%l = 0 then
*: u⁽ᵗ⁺¹⁾ ← Decrypt(û⁽ᵗ⁺¹⁾)
*: u⁽ᵗ⁺¹⁾ ← ⌊u⁽ᵗ⁺¹⁾ * 2ᵖ⌋/2ᵖ
*: û⁽ᵗ⁺¹⁾ ← Encrypt (u⁽ᵗ⁺¹⁾)
8: end if
9: ρ̂' ← ‖û⁽ᵗ⁺¹⁾ − û⁽ᵗ⁾‖₂
*: ρ' ← Decrypt(ρ̂' ), ρ' ← ρ' >ε
10: τ ← τ + 1
11: end while
12: ŵ⁽ᵗ⁾ ← ûᵗ
13: ρ̂ ← ‖ŵ⁽ᵗ⁾ − ŵ⁽ᵗ⁻¹⁾‖₂
*: ρ ← Decrypt(ρ̂ ), ρ ← ρ >ε
14: t ← t + 1
15: end while
16: Return: ŵ⁽ᵗ⁻¹⁾
```

In an example, another approach for a high-dimensional learning problem is considered that is a hard non-convex sparsity constraint in the optimization problem. For this approach, hard thresholding of the encrypted data may be used. A step of gradient descent may be performed, some of the top weighted features are chosen, and then a solution is searched for based on these limited features. This procedure is iteratively performed while feeding the result of the end of an iterate to the starting of the next.

In this example, communication with the client is only needed to determine the top weighted features. Those features do not need to be re-encrypted from the client. For a matrix X, $P_S(X)$ to denote the matrix obtained when looking at the columns in set S. The hard thresholding operation may be defined $HT_k(w^{(t)})$ which returns the indices of the top k absolute values in vector $w^{(t)}$. The computation and communication cost for the client system for this example is linear in dimensionality d of the feature vectors $x_i$. The pseudo code for this approach follows:

```
1: Input: Initial point
ŵ⁽⁰⁾,X̂,ŷ,step size γ,sparsity level k,number of iterations per cycle l,
convergence tolerance ε,precision p.
2: ρ ← true;t ← 1
3: while ρ do
4: ŵ⁽ᵗ⁾ ← ŵ⁽ᵗ⁻¹⁾ − γX̂ᵀ(X̂ŵ⁽ᵗ⁻¹⁾ − ŷ) // GD Update
*: w⁽ᵗ⁾ ← Decrypt(ŵ⁽ᵗ⁾)
*: S ← HT_k(w⁽ᵗ⁾) // top k features of ŵ⁽ᵗ⁾
5: v̂⁽⁰⁾ ← P_S(ŵ⁽ᵗ⁾)
6: ρ' ← true,τ ← 1
7: while ρ' do
8: v̂ᵗ ← v̂ᵗ − γP_S(X̂)ᵀ (P_S(X̂)v̂⁽ᵗ⁻¹⁾ − ŷ) //GD update
9: if i%l = 0 then
* vᵗ ← Decrypt(v̂ᵗ)
* vᵗ ← ⌊vᵗ * 2ᵖ⌋/2ᵖ
* v̂ᵗ ← Encrypt(vᵗ)
10: end if
11: ρ̂' ← ‖v̂⁽ᵗ⁾ − v̂⁽ᵗ⁻¹⁾‖₂,τ ← τ + 1
*: ρ' ← Decrypt(ρ̂'  ),ρ' ← ρ' > ε
12: end while
13: P_S(ŵ⁽ᵗ⁾) ← v̂⁽ᵗ⁻¹⁾,P_S̄(ŵ⁽ᵗ⁾) ← 0//updating top k dimensions
  and setting others to 0
14: ρ̂ ← ‖ŵ⁽ᵗ⁾ − w⁽ᵗ⁻¹⁾‖₂
*: ρ ← Decrypt(ρ̂ ), ρ ← ρ > ε
15: t ← t + 1
16: end while
17: Return: ŵ⁽ᵗ⁻¹⁾
```

Figure 3:
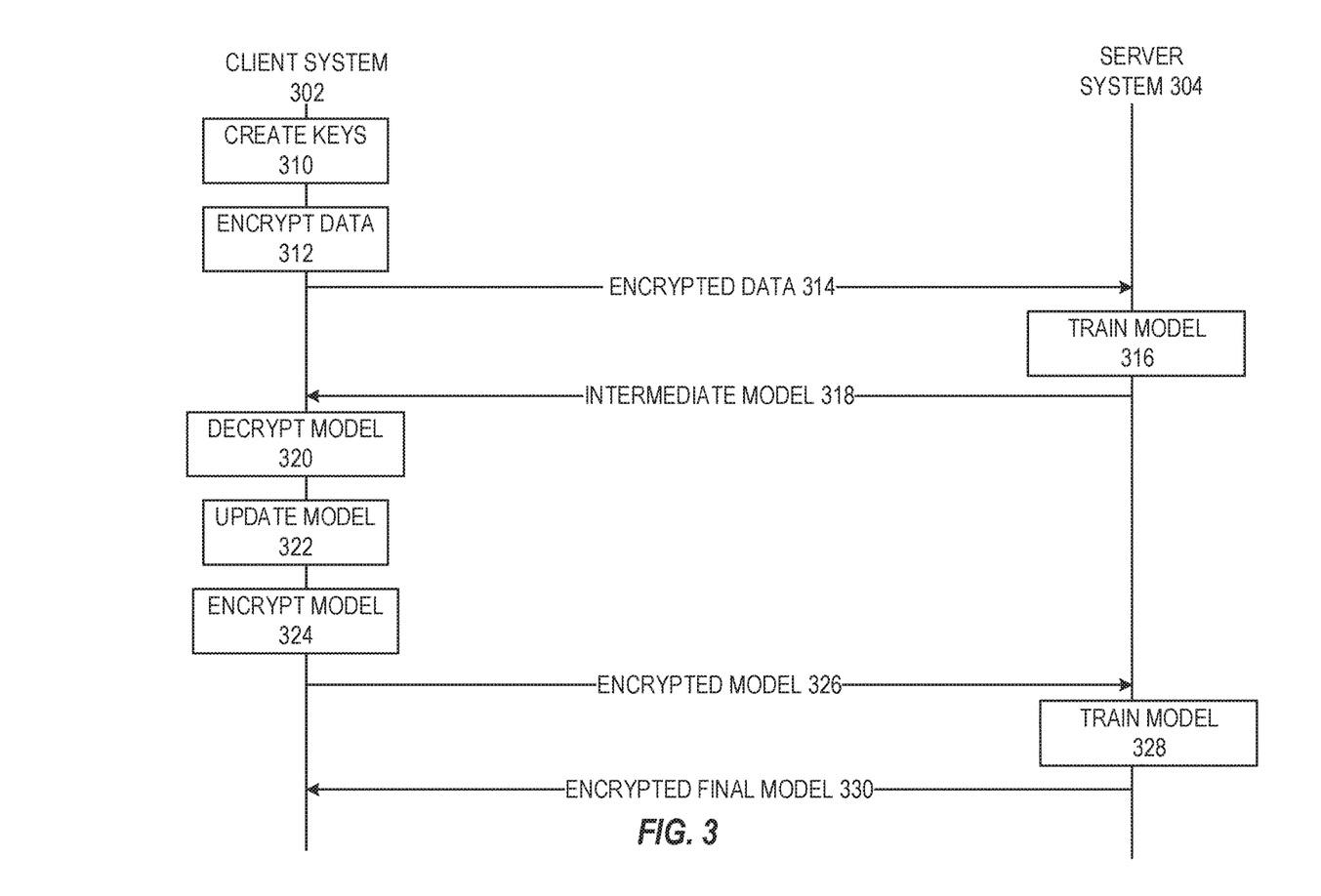
FIG. 3 is a flow diagram of processing encrypted data at a server system in accordance with respective examples.

FIG. 3 is a flow diagram of processing encrypted data at a server system in accordance with respective examples. In this example, a server system 304 is able to run machine learning algorithms on encrypted data received from a client system 302. The server system 304 trains models using only the encrypted data and never needs to decrypt the client's data. To protect its data, at 310, the client system 302 may create various keys. In an example, an encryption key, a decryption key, and a computation key are created by the client system 302. At 312, the client system 302 encrypts its data using the encryption key. The encrypted data may be a data set used to train a model. The data set may be split into training and validation examples. At 314, the encrypted data is sent to the server system 304. At 316, the server system may train a model using the encrypted data or a subset of the encrypted data using any of the various models described above. At 318 after a determined number of training iterations have occurred, the server system 304 provides the client system 302 with an intermediate model. The intermediate model is encrypted with the encryption key. At 320, the client system 302 may decrypt the model. At 322, the client system 322 may round one or more weights within the intermediate model. At 324, the updated model is encrypted with the encryption key. At 326, the encrypted updated model is sent to the server system 304 for further processing. At 328, the server system 304 continues to train the model based upon the received encrypted data. The updated model has weights that are able to be expressed and processed in the described encryption scheme. Eventually, a specified number of iterations or a precision of the model is reached. At this point the model is considered the final model. At 330, the encrypted final model may be sent back to the client system 302. The client system 302 may decrypt the final model and use the model to process data. In an example, the client system 302 may provide the server system 304 with additional encrypted data. The server system 304 may input this additional data into the model and provide the client system 302 with the results. In this example, the additional data, the model, and the results are always encrypted at the server system 304.

Figure 4:
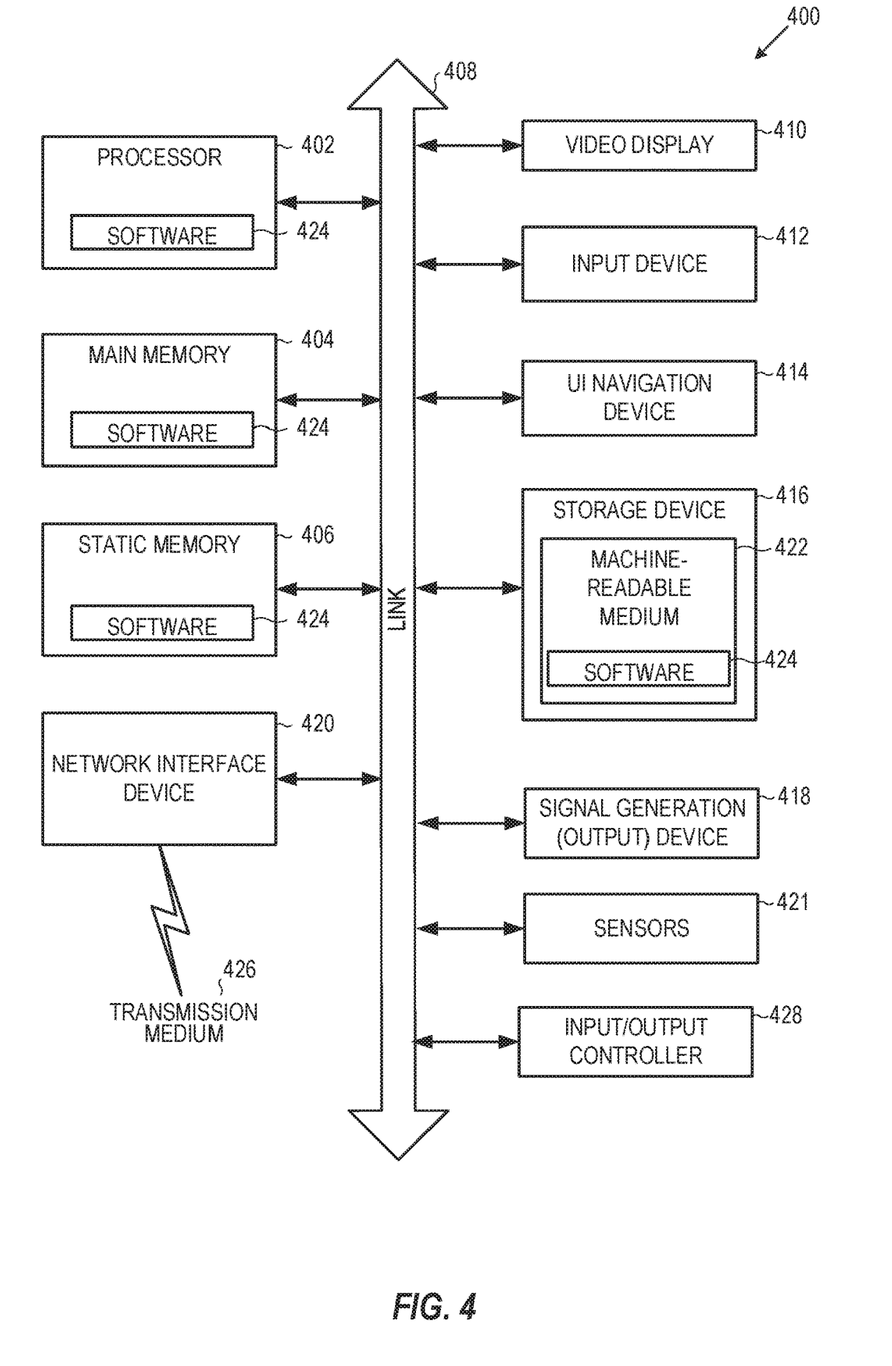
FIG. 4 is an example computing device that can be used in conjunction with the technologies described herein.

FIG. 4 is an example computing device that can be used in conjunction with the technologies described herein. In alternative embodiments, the computing device 400 may operate as a standalone device or may be connected (e.g., networked) to other computing devices. In a networked deployment, the computing device 400 may operate in the capacity of a server communication device, a client communication device, or both in server-client network environments. In an example, the computing device 400 may act as a peer computing device in peer-to-peer (P2P) (or other distributed) network environment. The computing device 400 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations.

Computing device 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The computing device 400 may further include a display unit 410, an input device 412 (e.g., a keyboard), and a user interface (UI) navigation device 414 (e.g., a mouse). In an example, the display unit 410, input device 412, and UI navigation device 414 may be a touch screen display. In an example, the input device 412 may include a touchscreen, a microphone, a camera (e.g., a panoramic or high-resolution camera), physical keyboard, trackball, or other input devices.

The computing device 400 may additionally include a storage device (e.g., drive unit) 416, a signal generation device 418 (e.g., a speaker, a projection device, or any other type of information output device), a network interface device 420, and one or more sensors 421, such as a global positioning system (GPS) sensor, compass, accelerometer, motion detector, or another sensor. The computing device 400 may include an input/output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 416 may include a computing-readable (or machine-readable) storage media 422, on which is stored one or more sets of data structures or instructions 424 (e.g., software) embodying or utilized by any one or more of the techniques or functions described herein. In an example, at least a portion of the software may include an operating system and/or one or more applications (or apps) implementing one or more of the functionalities described herein. The instructions 424 may also reside, completely or at least partially, within the main memory 404, within the static memory 406, and/or within the hardware processor 402 during execution thereof by the computing device 400. In an example, one or any combination of the hardware processor 402, the main memory 404, the static memory 406, or the storage device 416 may constitute computing device (or machine) readable media.

While the computer-readable storage media 422 is illustrated as a single medium, a "computer-readable storage media" or "machine-readable storage media" may include a single medium or multiple media (e.g., a centralized or distributed database, and/or associated caches and servers) configured to store the one or more instructions 424.

In an example, a computer-readable storage media or machine-readable storage media may include any medium that is capable of storing, encoding or carrying instructions for execution by the computing device 400 and that cause the computing device 400 to perform any one or more of the techniques of the present disclosure, or that is capable of storing encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 424 may further be transmitted or received over a communications network 426 using a transmission medium via the network interface device 420 utilizing any one of several transfer protocols (e.g, frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g. cellular networks), Plain Old Telephone (POTS) networks, and wireless data networks (e.g., Institute of Electrical and Electronics Engineers (IEEE) 802.8 family of standards known as Wi-Fi®, IEEE 802.16 family of standards known as WiMax®). IEEE 802.15.4 family of standards, a Long Term Evolution (LTE) family of standards, a Universal Mobile Telecommunications System (UMTS) family of standards, peer-to-peer (P2P) networks, among others. The network interface device 420 may use the transfer protocols to transmit data using transitory propagating signals.

In an example, the network interface device 420 may include one or more physical jacks (e.g., Ethernet, coaxial, or phone jacks) or one or more antennas to connect to the communications network 426. In an example, the network interface device 420 may include one or more wireless modems, such as a Bluetooth modem, a Wi-Fi modem or one or more modems or transceivers operating under any of the communication standards mentioned herein. In an example, the network interface device 420 may include a plurality of antennas to wirelessly communicate using at least one of single-input multiple-output (SIMO), multiple-input multiple-output (MIMO), or multiple-input single-output (MISO) techniques. In some examples, the network interface device 420 may wirelessly communicate using Multiple User MIMO techniques. In an example, a transmission medium may include any intangible medium that is capable of storing, encoding or carrying instructions for execution by the computing device 400, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the fill scope of equivalents to which such claims are entitled.

The invention claimed is:

1. A method for homomorphic data analysis, the method comprising:
receiving encrypted data, from a remote system, the encrypted data encrypted with an encryption key;
determining a number of iterations, greater than one, to iterate over the encrypted data in training an initial model using a gradient descent;
iterating over the initial model by the number of iterations to create an intermediate model, each iteration updates parameters of the initial model to generate parameters of the intermediate model, the parameters of the initial model and the intermediate model encrypted with the encryption key;
only after iterating over the initial model the number of iterations, providing the parameters of the intermediate model to the remote system;
receiving, from the remote system, updated intermediate model parameters;
iterating over an updated model formed based on the updated intermediate model parameters until a predetermined precision is reached to create a final model; and
providing parameters of the final model to the remote system, the parameters of the final model encrypted with the encryption key.

2. The method of claim 1, further comprising receiving a computation key, the computation key used to update the initial model.

3. The method of claim 1, further comprising:
receiving a vector of numbers encrypted with the encryption key;
inputting the vector of numbers to the final model to create results; and
sending the results to the remote system, the results encrypted with the encryption key.

4. The method of claim 1, the encryption key is private to the remote system.

5. The method of claim 1, the initial model comprising a vector of rational numbers.

6. The method of claim 5, the updated model comprising the intermediate model with the vector of rational numbers rounded.

7. The method of claim 5, further comprising:
receiving a set of top weighted features with the vector; and
iterating over only the set of top weighted features.

8. The method of claim 1, wherein the gradient descent includes a stochastic gradient descent.

9. A system for homomorphic data analysis, the system comprising:
a processing unit configured to perform operations comprising:
receiving encrypted data, from a remote system, the encrypted data encrypted with an encryption key;
determining a number of iterations, greater than one, to iterate over the encrypted data, in training an initial model using a gradient descent;
only after iterating over the initial model the number of iterations, iterating over the initial model by the number of iterations to create an intermediate model, each iteration updates parameters of the initial model to generate parameters of the intermediate model, the parameters of the initial model and the intermediate model encrypted with the encryption key;
providing the parameters of the intermediate model to the remote system;
receiving, from the remote system, updated intermediate model parameters;
iterating over an updated model formed based on the updated intermediate model parameters until a predetermined precision is reached to create a final model; and
providing parameters of the final model to the remote system, the parameters of the final model encrypted with the encryption key.

10. The system of claim 9, further comprising receiving a computation key, the computation key used to update the initial model.

11. The system of claim 9, the operations further comprising:
receiving a vector of numbers encrypted with the encryption key;
inputting the vector of numbers to the final model to create results; and
sending the results to the remote system, the results encrypted with the encryption key.

12. The system of claim 9, the encryption key is private to the remote system.

13. The system of claim 9, the initial model comprising a vector of rational numbers.

14. The system of claim 13, the update model comprising the intermediate model with the vector of rational numbers rounded.

15. The system of claim 13, the operations comprising:
receiving a set of top weighted features with the vector; and
iterating over only the set of top weighted features.

16. A non-transitory computer-readable storage media storing computer-executable instructions for homomorphic data analysis, the stored instructions comprising:
instructions to receive encrypted data, from a remote system, the encrypted data encrypted with an encryption key;
instructions to determine a number of iterations, greater than one, to iterate over the encrypted data in training an initial model using a gradient descent;
instructions to iterate over the initial model by the number of iterations to create an intermediate model, each iteration updates parameters of the initial model to generate parameters of the intermediate model, the parameters of the initial model and the intermediate model encrypted with the encryption key;
instructions to, only after iterating over the initial model the number of iterations, provide the parameters of the intermediate model to the remote system;
instructions to receive, from the remote system, updated intermediate model parameters;
instructions to iterate over an updated model formed based on the updated intermediate model parameters until a predetermined precision is reached to create a final model; and
instructions to provide parameters of the final model to the remote system, the parameters of the final model encrypted with the encryption key.

17. The non-transitory computer-readable storage media of claim 16, further comprising instructions to receive a computation key, the computation key used to update the model.

18. The non-transitory computer-readable storage media of claim 16, the instructions to further comprising:
   instructions to receive a vector of numbers encrypted with the encryption key;
   instructions to input the vector of numbers to the final model to create results; and
   instructions to send the results to the remote system, the results encrypted with the encryption key.

19. The non-transitory computer-readable storage media of claim 16, the encryption key is private to the remote system.

* * * * *